(12) United States Patent
Takedomi et al.

(10) Patent No.: US 6,936,770 B2
(45) Date of Patent: Aug. 30, 2005

(54) SEAL MEMBER

(75) Inventors: Harumi Takedomi, Saitama (JP);
Kentaro Shibuya, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/295,267

(22) Filed: Nov. 14, 2002

(65) Prior Publication Data

US 2003/0094301 A1 May 22, 2003

(30) Foreign Application Priority Data

Nov. 16, 2001 (JP) ........................................ 2001-352312

(51) Int. Cl.$^7$ ................................................. H02G 3/18
(52) U.S. Cl. .................. 174/65 G; 174/65 R; 174/135; 16/2.1; 248/56
(58) Field of Search ........................ 174/65 G, 65 SS, 174/65 R, 152 A, 153 A, 151, 155; 248/56; 16/2.1, 2.2; 459/604

(56) References Cited

U.S. PATENT DOCUMENTS

| | | | |
|---|---|---|---|
| 4,000,829 A | * | 1/1977 | Johnson et al. ............. 220/265 |
| 4,022,262 A | * | 5/1977 | Gunn .......................... 411/302 |
| 4,041,241 A | * | 8/1977 | Olmstead et al. ........ 174/153 G |
| 5,299,949 A | | 4/1994 | Fortin |
| 5,811,728 A | * | 9/1998 | Maeda ...................... 174/65 R |
| 6,140,592 A | * | 10/2000 | Paterek et al. ......... 174/152 GM |
| 6,259,033 B1 | * | 7/2001 | Kassulat ..................... 174/151 |

FOREIGN PATENT DOCUMENTS

| | | |
|---|---|---|
| EP | 0 514 174 A1 | 11/1992 |
| JP | 59-6468 | 1/1984 |

* cited by examiner

*Primary Examiner*—Dhiru R. Patel
(74) *Attorney, Agent, or Firm*—Hamre, Schumann, Mueller & Larson, P.C.

(57) ABSTRACT

A seal member made at a resilient material which allows a pass-through member 105 to pass through an opening 106 while opening a gap fanned between the pass-through member 105 and the opening 106. The periphery of the opening 106 is made to constitute a wavy and annular sealing portion 117 which undulates in a direction in which the pass-through member 105 passes through the opening 106.

6 Claims, 15 Drawing Sheets

SEAL MEMBER

BACKGROUND OF THE INVENTION

The present invention relates to a seal member which is preferable for use at a location through which a pass-through member is allowed to pass.

For example, a cooling structure is adopted for preventing the excessive heating of a high-voltage electrical equipment box which incorporates therein electrical equipment such as a battery and a control unit used on electric vehicles and hybrid vehicles which facilitate heat generation by allowing air to flow through the interior of the high-voltage electrical equipment box to carry away heat so generated to the outside of the box together with the air. As a cooling structure of this type, there exists, for example, a cooling structure in which an air inlet is provided on one side of a high-voltage electrical equipment box and an air outlet is provided on the other side of the same box, and a fan is mounted at the air outlet for forcibly discharging air from the high-voltage electrical equipment box, so that air is taken into the high-voltage electrical equipment box from the air inlet, then is passed through the interior of the high-voltage electrical equipment box and is finally discharged from the same box through the air outlet.

Incidentally, with the cooling structure described above, air needs to be prevented from being taken into the high-voltage electrical equipment box from other portions than the air inlet in order to cool the electrical equipment with good efficiency. Namely, in case air is taken into the high-voltage electrical equipment box from other portions than the air inlet, the flow rate of air in portions of the box which exist upstream of a portion or portions from which air is taken into the box is reduced, and therefore, the cooling efficiency of electrical equipment disposed upstream of the portion or portions where air is taken into the box is deteriorated. To cope with this problem, the sealing capability relative to a pass-through member such as a cable that is introduced into the high-voltage electrical equipment box from the outside to be connected to the electrical equipment in the box needs to be secured at a pass-through portion in a wall portion of the high-voltage electrical equipment box, and this results in use of, for example, a rubber seal member having formed thereon a flat and annular sealing portion having inside an opening through which a pass-through member is allowed to pass.

However, with the seal member which has the flat and annular sealing portion being used, in the event that a gap between the seal member and the cable is set to be closed, there was a case where the assembling property of the seal member was deteriorated as the fastening force increased.

In addition, a cable having a consistent diameter is not always used but a cable is sometimes used which has a large diameter portion provided at a position along a small diameter portion. In a case where sealing is implemented at the small diameter portion after the large diameter portion has been passed through the seal member, the use of a seal member is required which is formed into a shape having a slit formed in a sealing portion for allowing the large diameter portion to pass through the seal member. However, in case a slit like this is formed in the sealing portion, a certain amount of air is caused to flow through the slit, causing a problem that a sufficient level of sealing capability cannot be secured.

Note that a problem like the one described above happens at various types of sealing portions for preventing the flow of not only air but also various types of fluids or dust. In addition, a problem like the aforesaid problem also happens in a case where not only cables but also various types of pass-through members are allowed to pass through the sealing portions.

SUMMARY OF THE INVENTION

Consequently, it is an object of the invention to provide a seal member which can prevent the deterioration in assembling property which tends to occur in association with an increase in fastening force and which can secure a sufficient level of sealing capability relative not only to a pass-through member having a specific shape but also to a pass-through member having a shape that varies.

With a view to attaining the object, according to a first aspect of the invention, there is provided a seal member comprising a resilient material which allows a pass-through member (for example, a cable 105 in an embodiment) to pass through an opening (an opening 106 in the embodiment) while sealing a gap between the opening and the pass-through member that has passed through the opening, the seal member being characterized in that the periphery of the opening is made to constitute a wavy and annular sealing portion (for example, a sealing portion 117 in the embodiment) which undulates in a direction in which the pass-through member passes through the seal member.

Thus, since the periphery of the opening is made to constitute the wavy and annular sealing portion that undulates in the direction in which the pass-through member passes through the seal member, the sealing portion is allowed to easily deform, and even if the gap between the sealing portion and the pass-through member is closed in order to increase the adhesion by the sealing portion, vibrations, when applied, can be absorbed by virtue of the deformation of the sealing portion.

In addition, since the periphery of the opening is made to constitute the wavy and annular sealing portion that undulates in the direction in which the pass-through member passes through the seal member, the sealing portion is allowed to easily deform also in a direction in which the diameter thereof is expanded, and even in the event that sealing is implemented at a small diameter portion of the pass-through member which has a large diameter portion at a position along the small diameter portion after the large diameter portion has been allowed to pass through the sealing portion, the sealing portion is allowed to adhere to the small diameter portion after the large diameter portion is allowed to easily pass through the sealing portion.

According to a second aspect of the invention, there is provided a seal member as set forth in the first aspect of the invention, wherein the sealing portion is constructed such that an inner circumferential edge portion (for example, a thick portion 123 in the embodiment) of the sealing portion which faces the opening is made to be thicker than a peripheral portion (for example, a thin portion 124 in the embodiment) of the inner circumferential edge portion.

Thus, since the inner circumferential edge portion on the opening side is made to be thicker than the peripheral portion of the inner circumferential edge portion, the deformation of the pass-through member which results not only when the pass-through member passes through the sealing portion but also when vibrations are applied thereto can be facilitated, while the pass-through member is pressed against by this thick inner circumferential edge portion so as to secure the sealing capability.

According to a third aspect of the invention, there is provided a seal member as set forth in the first or second aspect of the invention, wherein a plurality of the sealing portions are provided in series such that adjacent sealing portions have waveforms in different phases.

Thus, since the plurality of the sealing portions are provided continuously in series such that the adjacent sealing portions have waveforms in different phases, in case pass-through members which pass through the openings inside the sealing portions attempt to fall all together in the same direction at one time, the attempted fall can be prevented.

DETAILED DESCRIPTION OF THE PREFERRED EMBODIMENT

A seal member according to an embodiment of the invention will be described below with reference to the accompanying drawings.

Firstly, a high-voltage electric equipment cooling apparatus for an automobile will be described to which the invention is applied. Note that the automobile referred to in this embodiment is a hybrid vehicle, in which when a motor is fed from a battery having a direct-current power supply the electric current is converted from a direct current to an alternating current by an inverter, and when an output from an engine or part of the kinetic energy of the vehicle is stored in the battery via the motor the electric current is then converted by the inverter from the alternating current to the direct current for storage. In addition, since the voltage of the direct current so converted by the inverter is high, the voltage of the direct current is partially lowered by a DC/DC converter. Then, the high-voltage electrical equipment cooling apparatus is such as to cool the battery, inverter and DC/DC converter.

Figure 1:
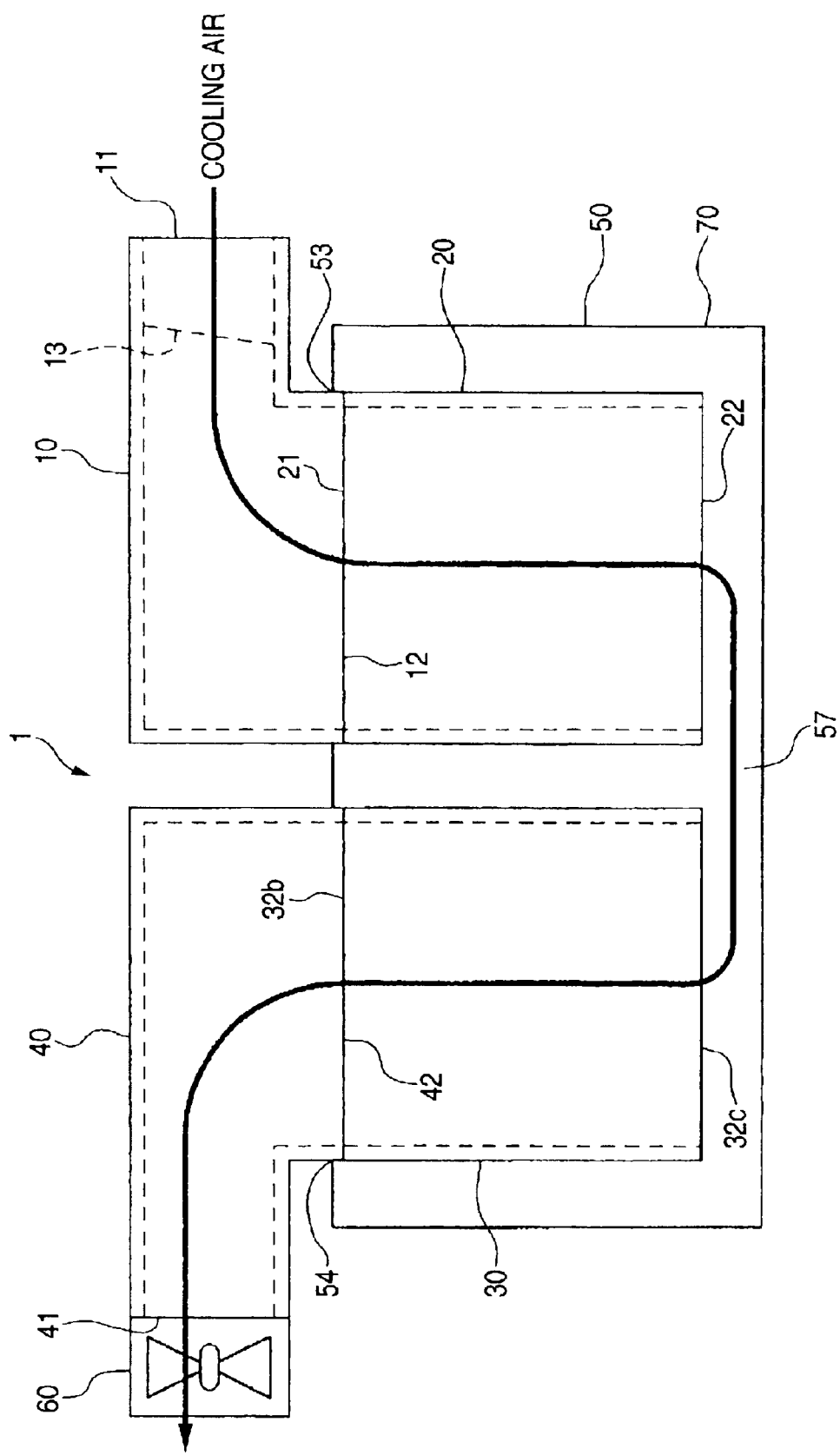
FIG. 1 is a drawing typically illustrating a high-voltage electrical equipment cooling apparatus for an automobile to which a seal member according to an embodiment of the invention is applied.

Referring to FIG. 1, a high-voltage electrical equipment cooling apparatus 1 will be described.

The high-voltage electrical equipment cooling apparatus 1 comprises an air inlet duct 10, a battery box 20, a heat sink case 30, an air outlet duct 40, an exterior box 50, and a fan 60.

The air inlet duct 10 has a cooling air entrance 11 which is opened and closed by means of a shutter 13. The battery box 20 is formed into a box-like shape and an upper opening 21 thereof connects to a lower opening 12 of the air inlet duct 10. A battery (not shown in FIG. 1) is installed in the interior of the battery box 20 which is constructed such that air flows therethrough. The heat sink case 30 is also formed into a box-like shape, and an upper opening 32b thereof connects to lower openings 42 of the air outlet duct 40. Heat sinks are provided in the interior of the heat sink case 30 which is constructed such that air flows therethrough, and the inverter and the DC/DC converter (both of them are not shown in FIG. 1) are disposed on an external surface of the heat sink case 30.

Then, the battery box 20, the heat sink case 30, the inverter and the DC/DC converter are encompassed by the exterior box 50. The exterior box 50 is a closed box having openings 53, 54 in an upper portion thereof, the opening 53 being connected to a connecting portion between the lower opening 12 of the air inlet duct 10 and the upper opening 21 of the battery box 20 in a sealed condition and the other opening 54 being connected to a connecting portion between the lower openings 42 of the air outlet duct 40 and the upper opening 32b of the heat sink case 30 in a sealed condition. The lower opening 22 of the battery box 20 and the lower opening 32c of the heat sink case 30 are allowed to communicate with each other through an interior space of the exterior box 50.

The air outlet duct 40 has a cooling air exit 41, and the fan 60 is provided at the cooling air exit 41. In addition, the fan 60 and the shutter 13 are constructed so as to operate in an interlocked fashion so that when the fan 60 turns the shutter 13 opens, whereas when the fan 60 stops turning the shutter 13 closes. Then, the battery box 20, the heat sink case 30 and the exterior box 50 constitute an electrical equipment box 70.

In the high-voltage electrical equipment cooling apparatus 1 constructed as has been described heretofore, turning the fan 60 opens the shutter 13, whereby cooling air is introduced into the air inlet duct 10 from the cooling air entrance 11. Cooling air so introduced into the air inlet duct 10 is discharged into the exterior box 50 after passing through the battery box 20 from the air inlet duct 10. Then, a heat exchange is implemented between the cooling air and the battery when the cooling air passes through the interior of the battery box 20, and as a result, the battery is cooled, and the cooling air, whose temperature is slightly increased, is then discharged into the exterior box 50. In addition, since the battery control temperature is low, even if the temperature of the cooling air is increased as a result of the cooling of the battery, the cooling air is still low enough to cool the inverter and the DC/DC converter.

The cooling air discharged into the exterior box 50 is introduced into the heat sink case 30 since the exterior box 50 is a closed box. Namely, the interior of the exterior box 50 becomes a cooling air passage 57 for directing the cooling air that has been used for cooling the battery to the inverter. The cooling air introduced into the heat sink case 30 passes through the interior of the heat sink case 30 to be discharged into the air outlet duct 40, and the cooling air so discharged into the air outlet duct 40 is then drawn by the fan 60 via the cooling air exit 41 so as to be discharged to the outside. A heat exchange is implemented between the cooling air and the heat sink case 30 when the cooling air passes through the interior of the heat sink case 30. Since heat from the inverter and DC/DC converter is conducted to the heat sinks via the heat sink case 30, the inverter and the DC/DC converter are cooled through the heat exchange between the cooling air and the heat sinks.

Next, referring to FIGS. 2 to 10, the high-voltage electrical equipment cooling apparatus will be described in greater detail.

Figure 7:
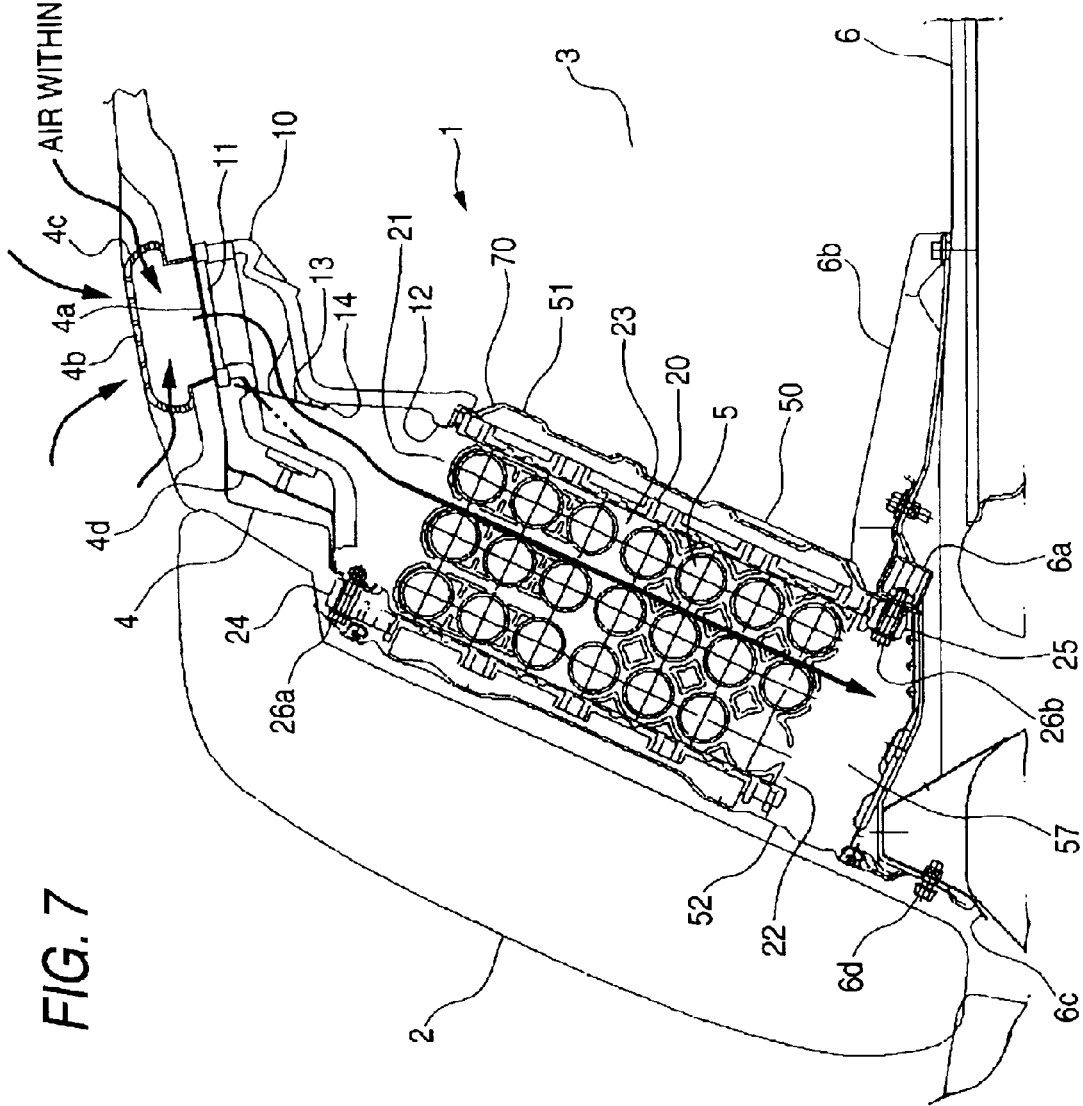
FIG. 7 is a vertical sectional view of the high-voltage electrical equipment cooling apparatus at a battery accommodating portion thereof.
Figure 9:
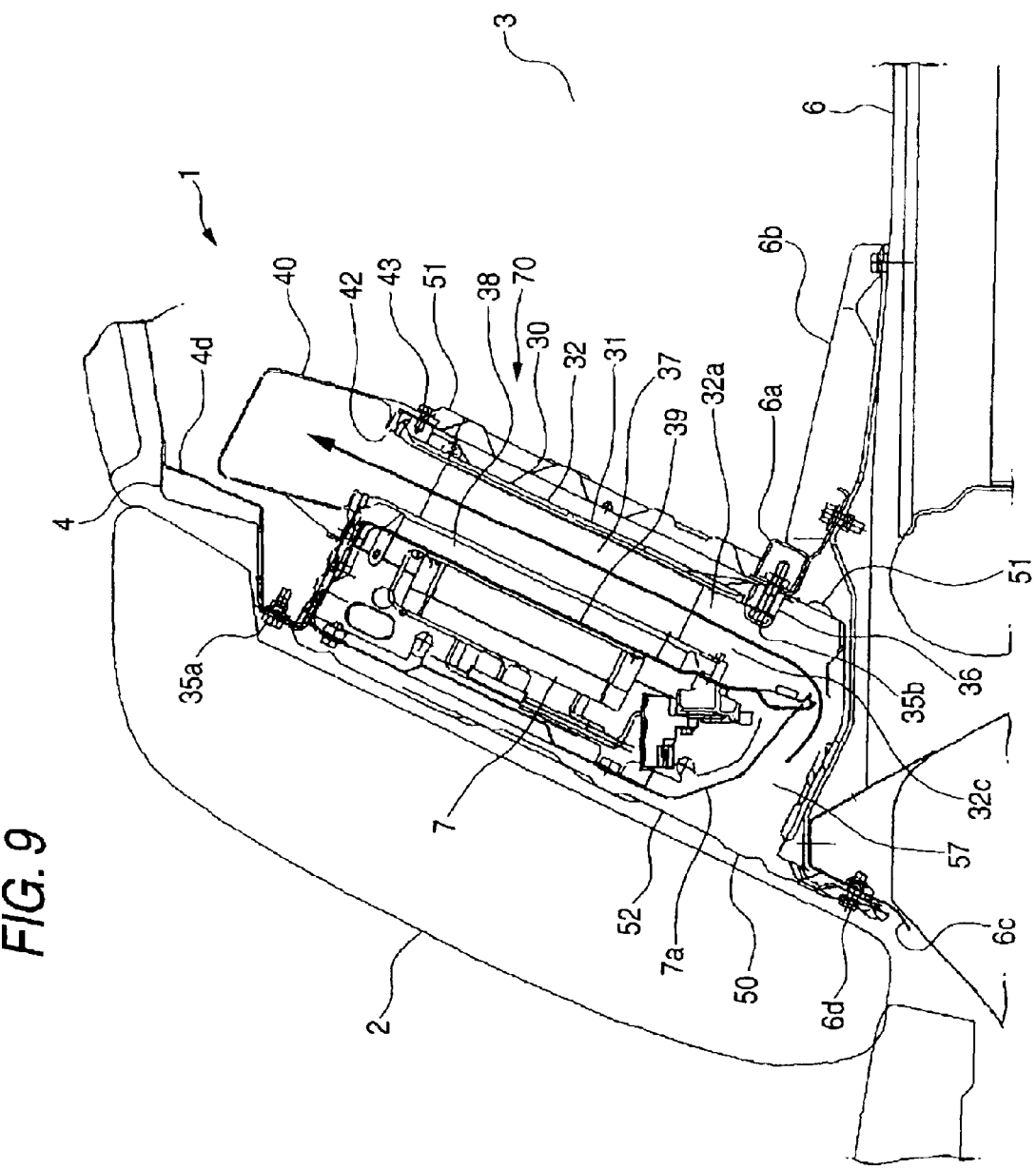
FIG. 9 is a vertical sectional view of the high-voltage electrical equipment cooling apparatus at an inverter accommodating portion thereof.

As shown in FIGS. 7 and 9, the high-voltage electrical equipment cooling apparatus 1 is disposed between a rear seat 2 and a trunk 3 and is disposed slightly inclined rearwards so as to follow the back side of the rear seat 2.

The high-voltage electrical equipment cooling apparatus 1 comprises the air inlet duct 10, the battery box 20, the heat sink case 30, the air outlet duct 40, the exterior box 50 and the fan 60.

The air inlet duct 10 is formed from an expanded polypropylene which is light in weight and has a high heat-insulating capability.

Figure 2:
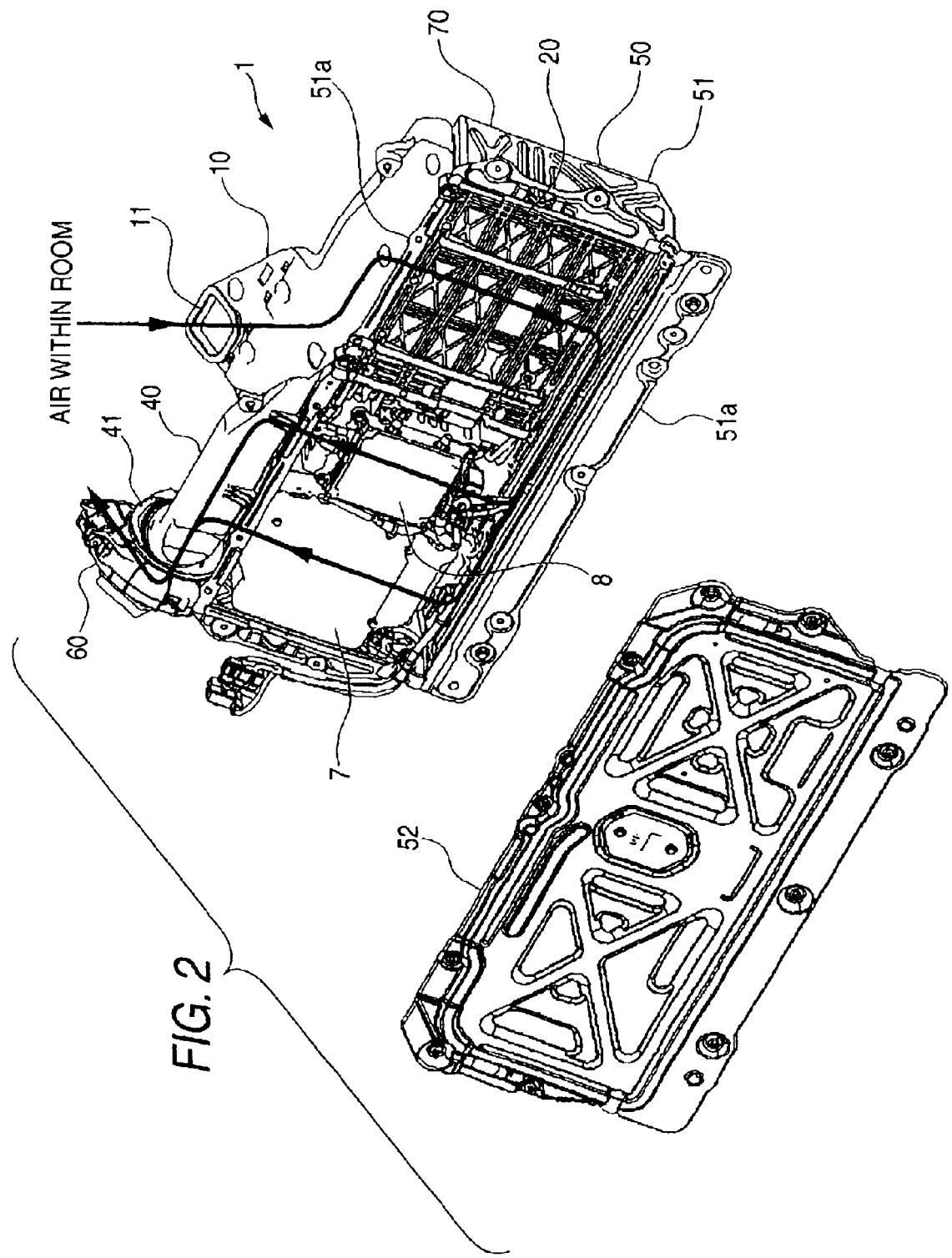
FIG. 2 is an exploded perspective view of the high-voltage electrical equipment cooling apparatus as viewed from the front of a vehicle.

As shown in FIGS. 2 and 7, the air inlet duct 10 has the cooling air entrance 11 which is provided at an upper end thereof and a lower opening 12 which is provided at a lower end thereof, the lower opening 12 being transversely elongated longer than the cooling air entrance 11 and having an opening area greater than that of the cooling air entrance 11.

The cooling air entrance 11 of the air inlet duct 10 connects to an air intake grille 4b disposed on an opening 4a formed in a rear shelf 4 of the vehicle via the opening 4a. The air intake grille 4b has a number of air inlets 4c formed in upper and side surfaces of a portion of the grille 4b which is exposed to the inside of a passenger compartment, so that air inside the passenger compartment can be introduced into the air inlet duct 10 from the air inlets 4c in the side surfaces of the grille 4b even if an article is placed on the air intake grille 4b to thereby close the air inlets 4c in the upper surface thereof.

In addition, the shutter 13 is disposed in the interior of the air inlet duct 10 at a position close to the cooling air entrance 11. The shutter 13 which is formed of EPDM rubber or the like is disposed so as to turn around an upper portion thereof which function as a fulcrum but is normally allowed to suspend downwardly by gravity so as to be seated, as indicated by a solid line in FIG. 7, on a valve seat 14 provided at an intermediate position along the air inlet duct 10 to thereby shut off a cooling air flow path. Then, when a negative pressure is generated on a downstream side of die shutter 13, the shutter 13 turns upwardly to come apart from the valve seat 14 to thereby open the cooling air flow path.

Figure 6:
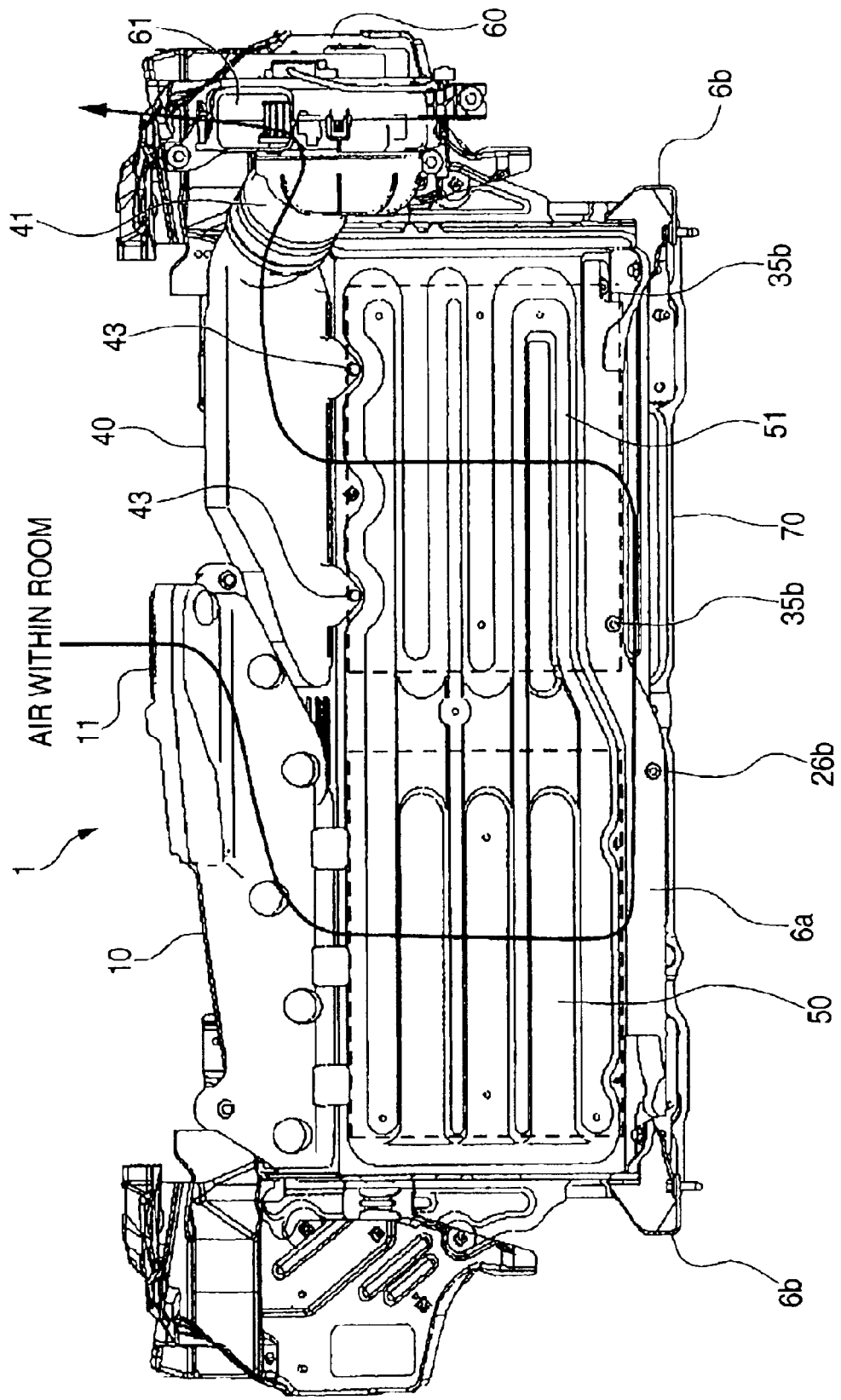
FIG. 6 is a back view of the high-voltage electrical equipment cooling apparatus as viewed from the rear of the vehicle.

As shown in FIGS. 2, 6 and 9, the air outlet duct 40 has the cooling air exit 41 which is provided at the rear of an upper portion thereof, as well as the two lower openings which are provided at the lower end thereof. The fan 60 is placed at the cooling air exit 41 for discharging cooling air in the air outlet duct 40 to the outside, and cooling air that is discharged from an air outlet 61 of the fan 60 is discharged into the trunk 3 via a duct not shown.

The air inlet duct 10 and the air outlet duct 40 are connected to each other via the battery box 20, the heat sink case 30 and the exterior box 50.

Figure 3:
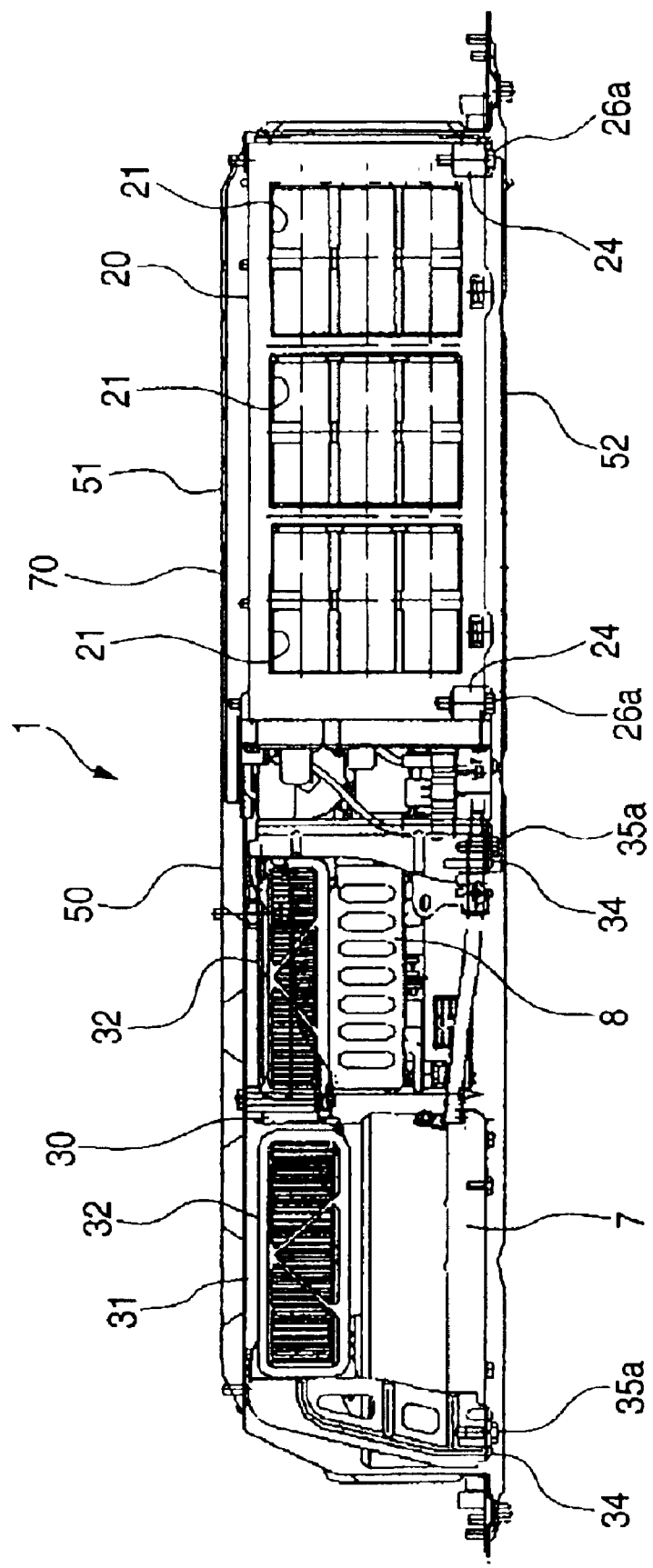
FIG. 3 is a horizontal sectional view of the high-voltage electrical equipment cooling apparatus.
Figure 4:
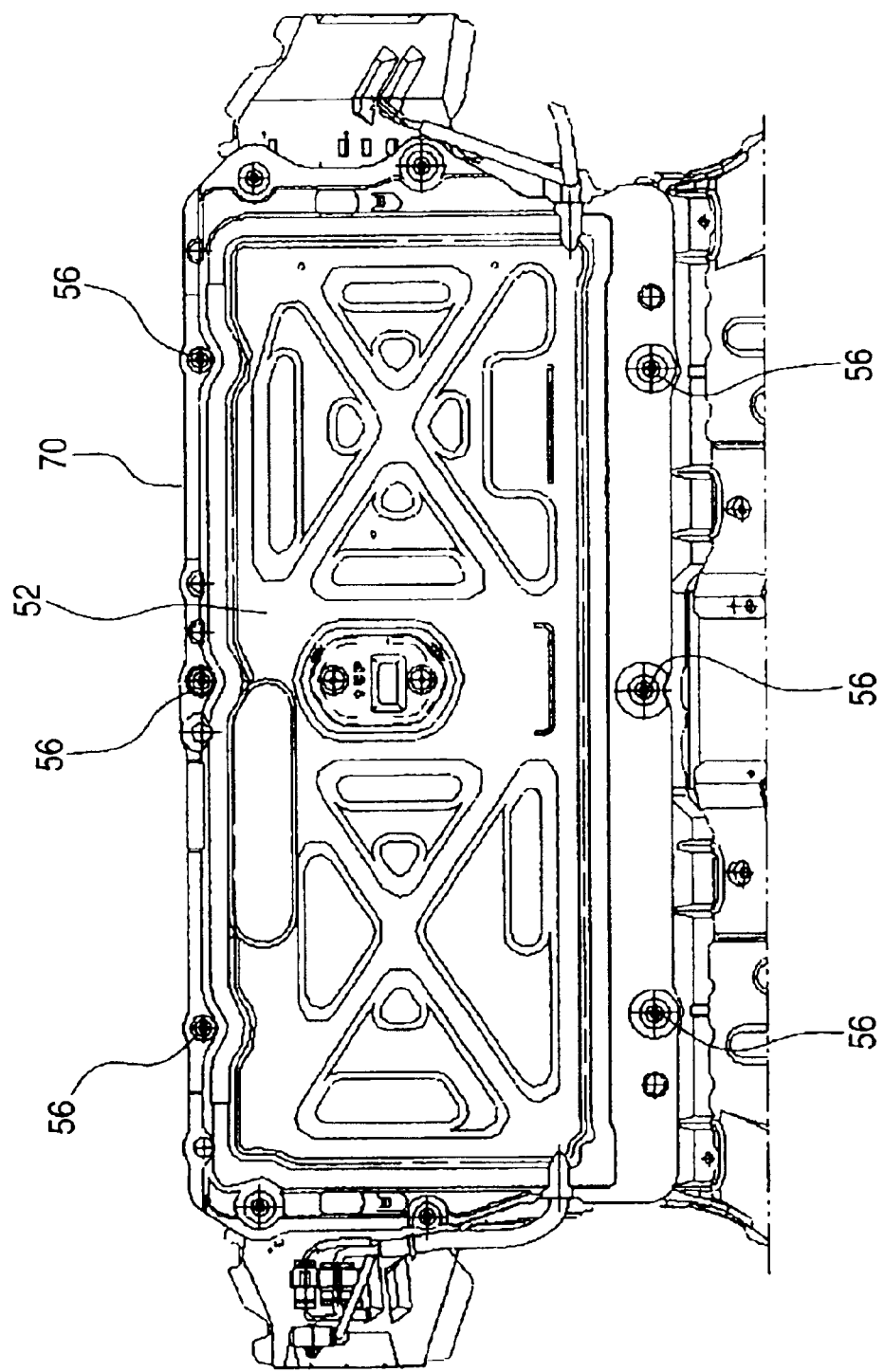
FIG. 4 is a front view of the high-voltage electrical equipment cooling apparatus as viewed from the front of the vehicle.

The battery box 20 is formed from a material such as FRP (resin) which is light in weight and high in rigidity, and is, as shown in FIGS. 3 and 7, formed into a box-like shape having pluralities of upper openings 21 and lower openings 22 in upper and lower portions thereof, respectively. An interior space 23 of the battery box 20 is constructed so as to constitute not only a passage through which air flows but also an accommodating space which accommodates a number of batteries 5, whereby cooling air flows into the interior space 23 of the battery box 20 from the upper openings 21, passes through between the batteries 5, when a heat exchange is implemented between the cooling air and the batteries 5, and is discharged to the outside of the battery box 20 from the lower openings 22.

Figure 8:
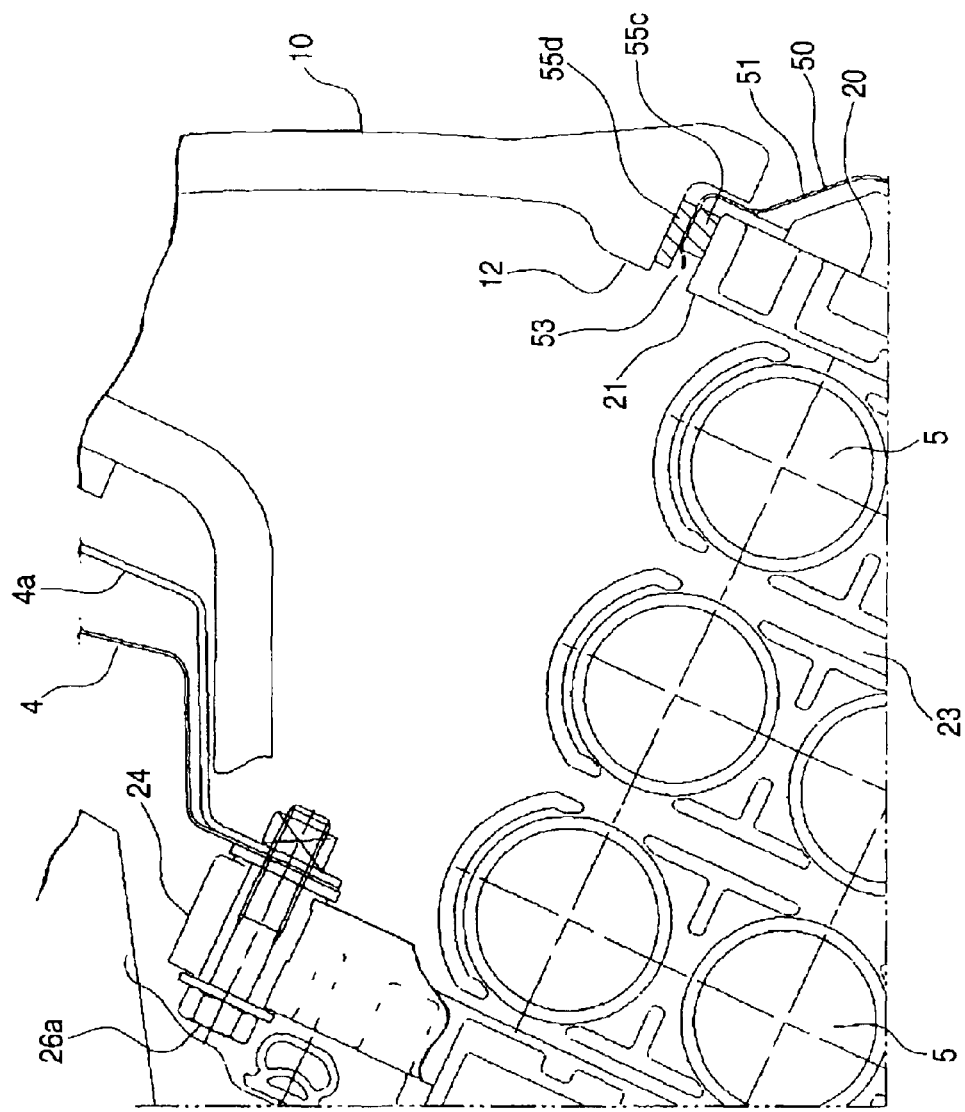
FIG. 8 is an enlarged view showing a main part of FIG. 7.

Pairs of left and right fixing bosses 24, 25 are provided at a front side of the upper portion and a rear side of the lower portion of the battery box 20 in such a manner as to protrude therefrom. As shown in FIGS. 7 and 8, the two upper fixing bosses 24, 24 are fixed to the rear shelf 4 and a reinforcement 4d thereof with bolts 26a. On the other hand, the two lower fixing bosses 25, 25 are, as shown in FIGS. 6 and 7, fixed to a pipe frame 6a disposed in the trunk 3 in such a manner as to extend transversely with bolts 26b. The pipe frame 6a is extended between a pair of side frames 6b, 6b which are fixed to the left and right of a vehicle body floor 6 within the trunk 3 for fixture thereto and is disposed slightly above the vehicle body floor 6. As a result, being fixed to the vehicle body at the two portions at the front of the upper portion and at the two portions at the rear of the lower portion thereof, the battery box 20 is firmly supported on the vehicle body.

Figure 10:
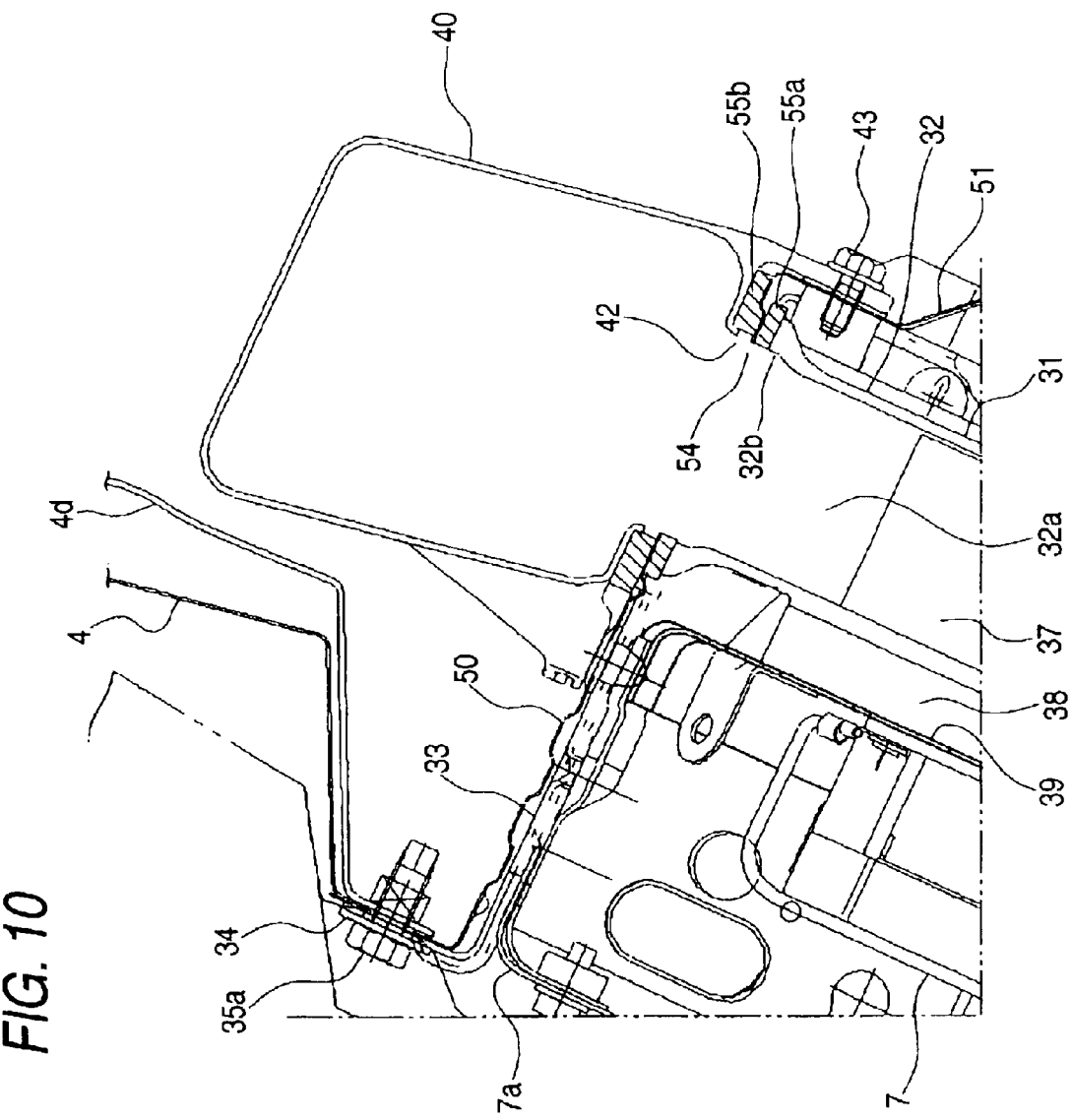
FIG. 10 is an enlarged view showing a main part of FIG. 9.

The heat sink case 30 is formed from a material such as magnesium which is light in weight and high in rigidity and comprises, as shown in FIGS. 3, 9 and 10, a main body portion 31 comprising in turn two box-like tubular bodies 32, 32 which extend vertically and are disposed side by side so as to be coupled together. The main body portion 31 is disposed such that a rear surface thereof substantially aligns with a rear surface of the battery box 20. Mounting arms 33 extend forward from ends of a front side of an upper portion of the main body portion 31 and distal ends of the mounting arms 33 are bent upwardly so as to constitute fixing flanges 34. Front surfaces of the fixing flanges 34 are disposed so as to substantially align with front surfaces of the upper fixing bosses 24 of the battery box 20, and the fixing flanges 34 are fixed to the rear shelf 4 and the reinforcement 4d thereof with bolts 35a. In addition, fixing bosses 36 are provided at ends of a rear side of a lower portion of the main body portion 31, and the fixing bosses 36 are fixed to the pipe frame 6a with bolts 35b. As a result, being fixed to the vehicle body at the two upper front portions and the two lower rear portions thereof, the heat sink case 30 is supported firmly on the vehicle body.

An interior space 32a of each tubular body 32 constitutes a passage through which cooling air flows. In addition, a number of heat dissipating plates (heat sinks) 37 provided in the interior space 32a of each tubular body 32 which plates erect from an interior wall of a heat conducting pedestal 38 and extend vertically. Furthermore, the heat conducting pedestal 38 is provided so as to protrude from a portion which is a front exterior surface of the main body portion 31 and where the heat dissipating plates 37 of the respective tubular bodies 32 are disposed, and a mounting tray 39 is fixed to the heat conducting pedestal 38 for covering substantially the front side of the main body portion 31. An upper end of the mounting tray 39 is disposed inwardly of the arms 33 and a lower end thereof extends downwardly of the main body portion 31.

Figure 5:
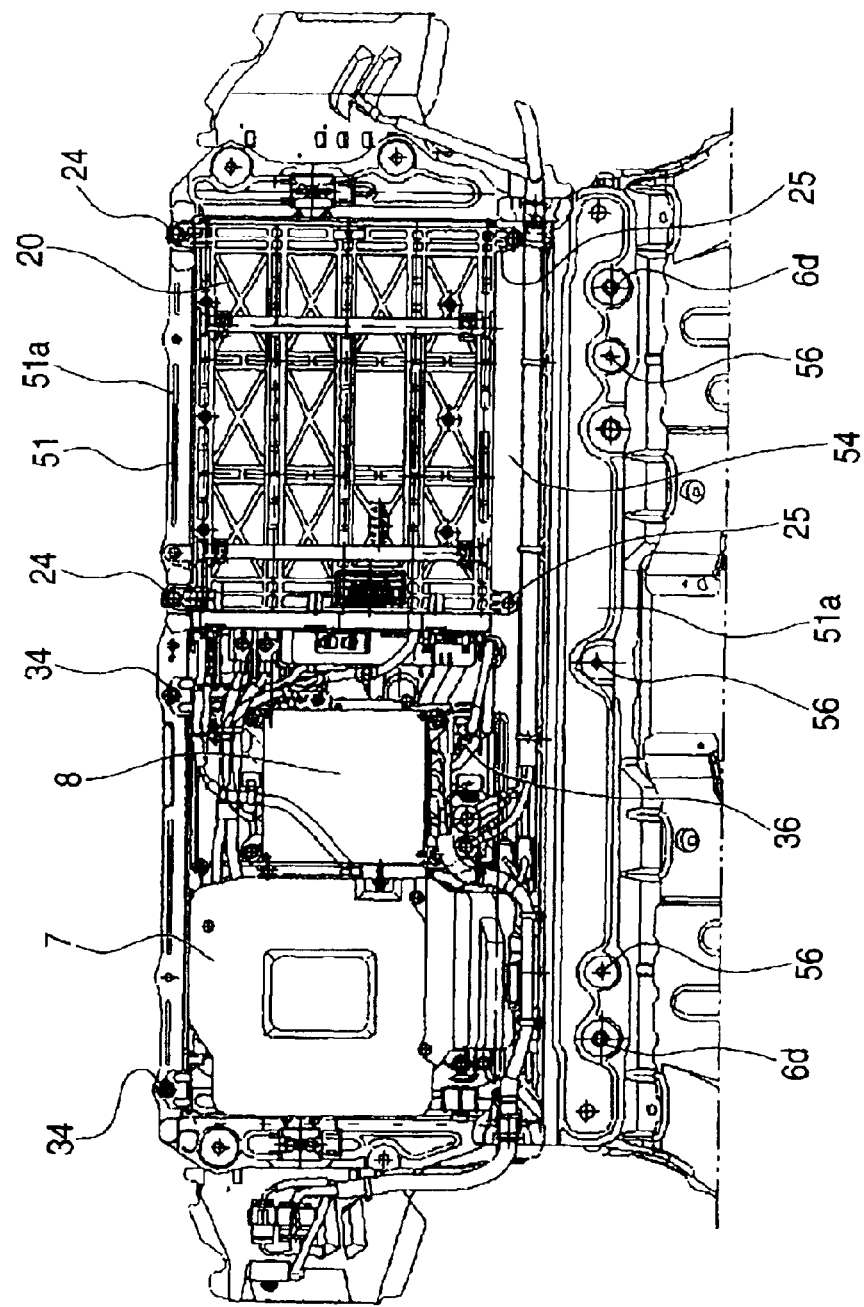
FIG. 5 is a front view of the high-voltage electrical equipment cooling apparatus as viewed from the front of the vehicle with part of the constituent components being removed.

As shown in FIGS. 3 and 5, the inverter 7 is mounted on the mounting tray 39. The DC/DC converter 8 is such as to lower the voltage of a direct current which is converted from an alternating current by the inverter 7. In addition, in FIG. 9, reference numeral 7a denotes a hood attached to the inverter 7 for covering the same. A peripheral edge of this hood 7a is fitted on the outside of the mounting tray 39, and the inverter 7 is surrounded by the mounting tray 39 and the hood 7a. A hood having the same function and construction is also provided on the DC/DC converter 8. In the heat sink case 30 constructed as has been described heretofore, heat generated from the inverter 7 and the DC/DC converter 8 is conducted to the heat dissipating plates 37 via the heat conducting pedestal 38. Then, a heat exchange is implemented between cooling air flowing through the interior spaces 32a of the tubular bodies 32 and the heat dissipating plates 37.

The exterior box 50 is a box formed of a thin sheet metal and accommodates therein the battery box 20, the heat sink case 30, the inverter 7, the DC/DC converter 8, an ECU and the like. As shown in FIG. 2, the exterior box 50 comprises a main body portion 51 which has a fully opened front side and a lid plate 52 adapted to close the front-side opening of the main body portion 51. Formed in an upper surface of the main body portion 51 at a position corresponding to the upper opening 21 of the battery box 20 is an opening 53 having the same configuration and dimensions as those of the upper opening 21 (refer to FIG. 8), and also formed in the heat sink case 30 at positions corresponding to the upper openings 32b of the respective tubular bodies 32 are openings 54 having the same configuration and dimensions as those of the upper openings 32 (refer to FIG. 10).

As shown in FIG. 10, the peripheral edges of the openings 54 in the exterior box 50 are placed on the peripheral edges of the upper openings 32b in the tubular bodies 32 in the heat sink case 30 with a sealing material 55a being held therebetween, and furthermore, the peripheral edges of the lower openings 42 in the air outlet duct 40 are placed on the peripheral edges of the openings 54 in the exterior box 50 with a sealing material 55b being held therebetween, whereby the upper openings 32b in the heat sink case 30, the openings 54 in the exterior box 50 and the lower openings 42 in the air outlet duct 40 are connected to each other in sealed conditions when the air outlet duct is fastened to the main body portion 51 with bolts 43.

On the other hand, as shown in FIG. 8, the peripheral edge of the opening 53 in the exterior box 50 is placed on the peripheral edge of the upper opening 21 in the battery box 20 with a sealing material 55c being held therebetween, and furthermore, the peripheral edge of the lower opening 12 in the air inlet duct 10 is placed on the peripheral edge of the opening 53 in the exterior box with a sealing material 55d being held therebetween, whereby the upper opening 21 in the battery box 20, the opening 53 in the exterior box 50 and the lower opening 12 in the air inlet duct 10 are connected to each other in sealed condition when the air inlet duct 10 is fixed to the battery box 20 with a fixing means which is not shown.

In addition, a flange portion 51a is provided around a peripheral edge of the front side opening of the exterior box 50, and a peripheral edge portion of the lid plate 52 is fixed to the flange portion 51a with machine screws 56. In addition, the flange portion 51a is disposed so as to substantially align with front surfaces of the upper fixing bosses 24 of the battery box 20 and front surfaces of the fixing flanges 34 of the mounting arms 33 of the heat sink case 30, and notches are provided in the flange portion 51a for avoiding the interference with the fixing bosses 24 and fixing flanges 34.

In the interior of the exterior box 50, a lower end of the battery box 20 is spaced apart from an inner bottom portion of the exterior box 50 (refer to FIG. 7), and a lower end of the mounting tray 39 disposed in the heat sink case 30 and a lower end of the main body portion 31 of the heat sink case 30 are spaced apart from the inner bottom portion of the exterior box 50 (refer to FIG. 9). Then, the interior of the closed exterior box 50 constitutes the cooling air passage 57 for establishing a communication between the lower opening 22 in the battery box 20 and the lower openings 32c of the tubular bodies 32 in the heat sink case 30.

As shown in FIGS. 7 and 9, the exterior box 50 is held between the lower fixing bosses 25 of the battery box 20 and the pipe frame 6a at a fastening portion where the fixing bosses 25 are fastened to the pipe frame 6a and is also held between the fixing bosses 36 of the heat sink case 30 and the pipe frame 6a at a fastening portion where the fixing bosses 36 are fastened to the pipe frame 6a and are fastened together with the fixing bosses 25, 30 to the pipe frame 6a. In addition, a lower flange portion 51a and the lid plate 52 are fixed with bolts 6d to a support frame 6c which is disposed so as to extend transversely on the vehicle body floor 6. Note that in this embodiment, the battery box 20, the heat sink case 30 and the exterior box 50 constitute the electrical equipment box 70.

In the high-voltage electrical equipment cooling apparatus 1 constructed as has been described heretofore, since a negative pressure is generated within the air inlet duct 10 when the fan 60 turns, the shutter 13 turns upwardly and comes apart from the valve seat 14 to there open the cooling air flow path. As a result, air inside the passenger compartment flows into the air inlet duct 10 as cooling air from the air inlets 4c in the air inlet grille 4b, flows further into the interior space 23 of the battery box 20 from the lower opening 12 in the air inlet duct 10 via the upper opening 21 in the battery box 20, and flows downwardly through between the batteries 5 accommodated in the interior space 23. As this occurs, the air which is originated from the passenger compartment (hereinafter, referred to as "cooling air") and which flows through the interior space 23 carries out a heat exchange with the batteries 5, and as a result, the batteries 5 are cooled and the cooling air is heated and the temperature of the cooling air is slightly increased. However, since the control temperature of the batteries 5 is low, even if the temperature of the cooling air is increased as a result of the heat exchange with the batteries 5, the amount of increase in temperature is small and the cooling air is still low enough to cool the inverter 7 and the DC/DC converter 8. The cooling air used for cooling the batteries 5 is discharged into the exterior box 50 from the lower opening 22 in the battery box 20.

Since the exterior box 50 is closed and only the interior spaces 32a of the two tubular bodies 32 in the heat sink case 30 can be used as a flow path through which air is allowed to flow out, the cooling air discharged from the battery box 20 into the exterior box 50 flows into the interior spaces 32a of the tubular bodies 32 from the lower openings 32c of both the tubular bodies 32 after passing through the cooling air passage 57 and then flows upwardly along the interior spaces 32a while passing through between the heat dissipating plates 37 accommodated in the interior spaces 32a. As this occurs, heat exchanges take place between the cooling air flowing through the interior spaces 32a and the heat dissipating plates 37, and as a result, the heat dissipating plates 37 are cooled and the cooling air is heated and the temperature thereof is increased. Incidentally, since heat generated by the inverter 7 and the DC/DC converter 8 is conducted to the heat dissipating plates 37 within both the tubular bodies 32, the inverter 7 and the DC/DC converter 8 are cooled when the heat dissipating plates 37 are cooled.

Then, the cooling air whose temperature is increased as a result of the heat exchanges with the heat dissipating plates 37 is discharged into the air outlet duct 40 from the upper openings 32b in the respective tubular bodies 32 in the heat sink case 30 via the lower openings 42 in the air outlet duct 40 and is then drawn out of the air outlet duct 40 via the cooling air exit 41 by the fan 60. Thereafter, the cooling air is discharged into the trunk 3 from the air outlet 61 of the fan 60 via the duct which is not shown.

Next, referring to FIGS. 11 to 18, a seal member according to the embodiment will be described.

Figure 11:
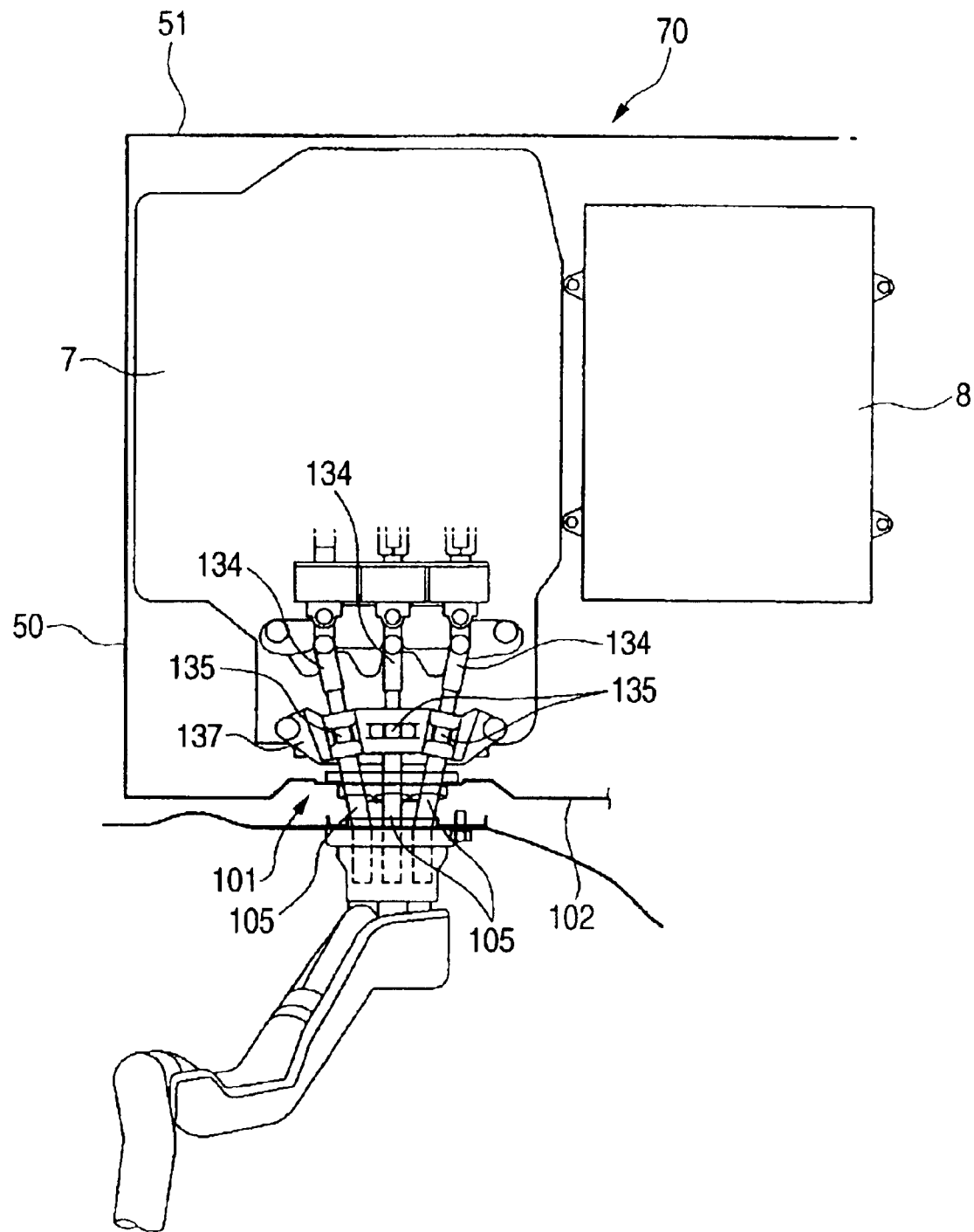
FIG. 11 is a vertical sectional view showing the seal member and a peripheral portion thereof according to the embodiment of the invention.
Figure 12:
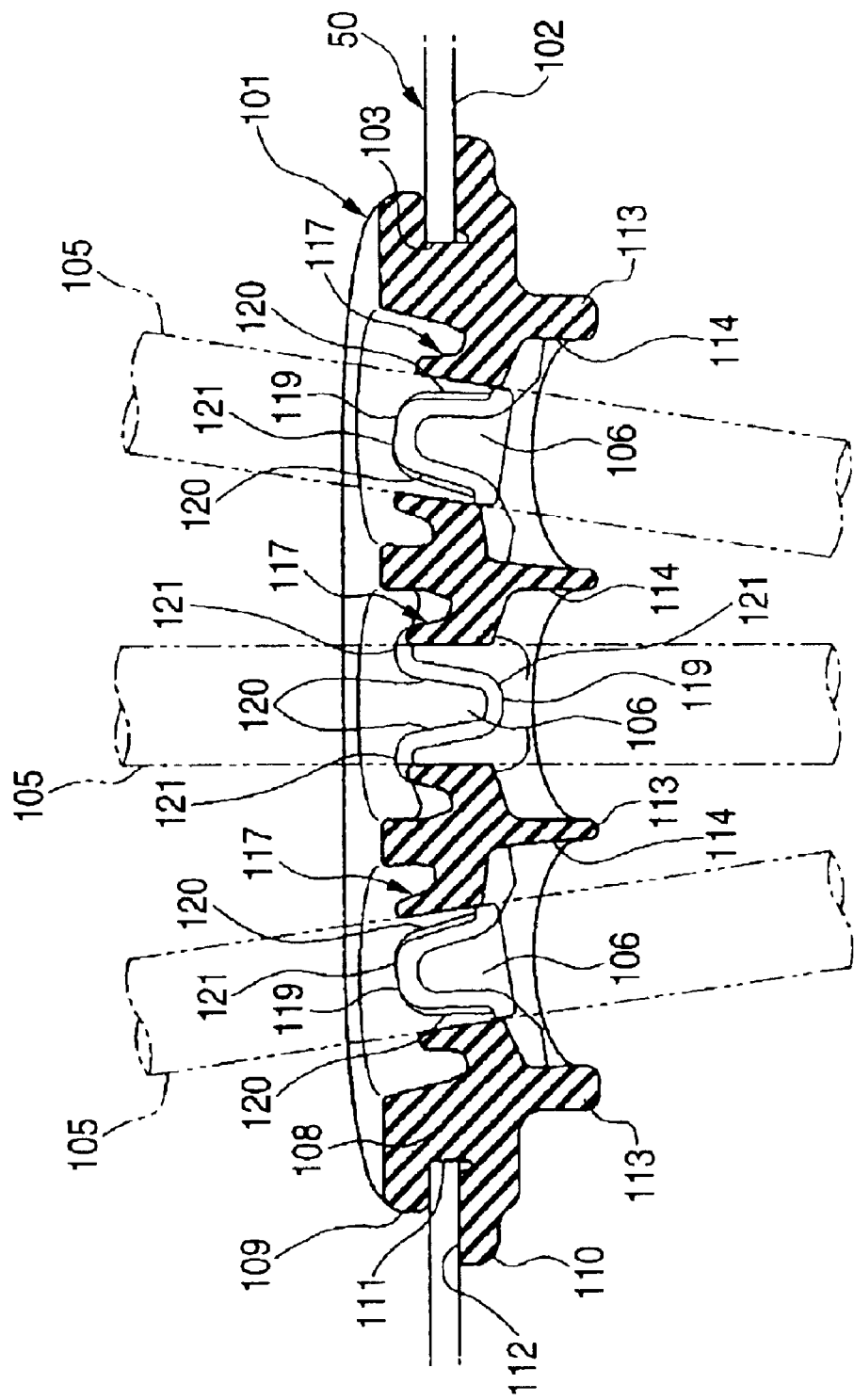
FIG. 12 is a front sectional view showing, together with cables, a state in which the seal member according to the embodiment of the invention is mounted.
Figure 13:
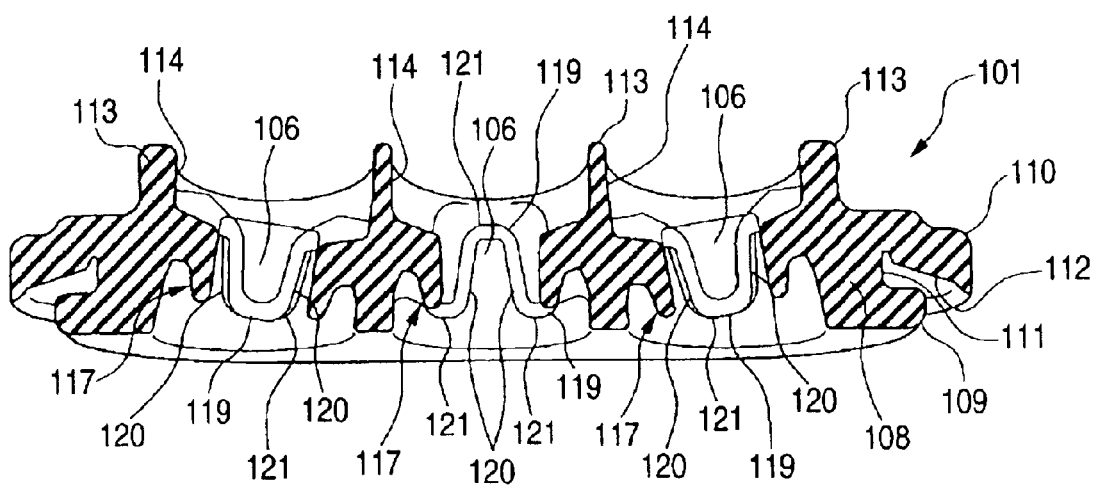
FIG. 13 is a front sectional view showing the seal member according to the embodiment of the invention.

A seal member 101 according to the embodiment is, as shown in FIG. 11, such as to be mounted to a lower plate portion 102 of the exterior box 50 for allowing a plurality of cables 105 (to be specific, three-phase alternating current cables, which are pass-through members) that are introduced from the outside to the inside of the exterior box 50 for connection to the inverter 7 installed in the exterior box 50 to pass therethrough and sealing a gap formed between the seal member 101 and the cables 105 that are allowed to so pass through the seal member to thereby seal the gap between the cables 105 and the lower plate portion 102. Here, as shown in FIG. 12, the seal member 101 is mounted in a mounting hole 103 formed in the lower plate portion 102 of the exterior box 50 in such a manner as to fit therein and allows the cables 105 to pass through three openings 106 formed inside the seal member 101 in such a manner as to penetrate it with one cable 105 passing through one opening 106.

As shown in FIGS. 13 to 16, the seal member 101 according to the embodiment is an integrally molded article of a resilient material, specifically speaking, rubber, and is formed substantially into a shape in which semi-circles are connected to longitudinal ends of a rectangle as viewed in a thickness direction of the seal member 101. In addition, in the seal member 101, the respective openings 106 penetrate the seal member 101 substantially in the thickness direction thereof, and as a result, the cables 105 are allowed to pass through the seal member 101 in the thickness direction.

The seal member 101 of the embodiment has a central main portion 108, a holding flange portion 109 formed around the full circumference of the main portion 108 in such a manner as to protrude outwardly from an outer circumferential edge portion of the main portion 108 in a direction normal to the thickness direction of the seal member 101 and a holding flange portion 110 formed, as with the holding flange portion 109, around the full circumference of the main portion 108 in such a manner as to protrude outwardly from the outer circumferential edge portion of the main portion 108 in the direction normal to the thickness direction of the seal member 101 as well as to be offset in the thickness direction relative to the holding flange portion 109, and as a result of this, an annular groove portion 111 is formed in the seal member 101 around the full circumference thereof in the direction normal to the thickness direction of the seal member 101 between the holding flange portion 109 and the holding flange portion 110.

Here, while the holding flange portion 109 protrudes straight in the direction normal to the thickness direction of the seal member 101, a surface portion 112 of the other holding flange portion 110 which is situated on the holding flange portion 109 side inclines in such a manner as to come closer to the holding flange portion 109 side as it protrudes outwardly. Moreover, the other holding flange portion 110 protrudes more outwardly than the holding flange portion 109 around the full circumference of the main portion 108.

Furthermore, the seal member 101 according to the embodiment has a substantially cylindrical wall portion 113 which is formed in such a manner as to protrude from the main portion 108 only in one of the thickness directions with a central axis thereof being disposed substantially along the thickness direction of the seal member 101, and a plurality of such wall portions 113 (to be specific, three which is identical to the number of cables 105 that are allowed to pass through the seal member 101) are arranged in a longitudinal direction of the seal member 101. Here, the wall portions 113 are provided continuously in series in such a manner that the adjacent wall portions 113 partially overlap each other and, moreover, that inner circumferential surfaces 114 thereof are independent from each other. A surface portion 115 of each wall portion 113 which is situated on an opposite side thereof to the main portion 108 is disposed on the same plane and, moreover, inclines in such a manner that the height of one side is lower than the height of an opposite side.

Then, an annular sealing portion 117 is integrally formed on the inner circumferential surface 114 of each wall portion 113 in such a manner as to protrude radially inwardly from the inner circumferential surface 114, and the opening 106 which penetrates the seal member 101 in the thickness direction is disposed at a distal end of the annular sealing portion 117 so protruding (in other words, the periphery of the opening portion 106 constitutes the sealing region). Note that the inner circumferential surface 114 of the wall portion 113 is formed to penetrate the seal member 101 in the thickness direction thereof except for the sealing portion 117. In addition, the center axes of the inner circumferential surfaces 114 situated at longitudinal ends of the seal member 101 are disposed such that the inner circumferential surfaces 114 incline so as to be positioned more radially outwardly as they extend in the thickness direction of the seal member 101 to come closer to the holding flange portion 109. Furthermore, the opening portions 106 are formed into a circular shape as viewed from the direction of the center axes of the inner circumferential surfaces 114, and the cables 105 pass, respectively, through the openings 106 along the center axes.

The sealing portion 117 is shaped into a waveform which undulates in the axial direction (the direction in which the cable 105 passes through) of the wall portion 113 in which the sealing portion 117 is disposed. Namely, each sealing portion 117 has a top plate portion 119 which is formed substantially into an isosceles trapezoid in which the width on the opening 106 side is narrow and two side plate portions 120 which extend in an inclined fashion from sides of the top plate portion 119 in a circumferential direction of the opening 106 such that a distance between the side plate portions 120 expands gradually, and a plurality (six in the illustrated embodiment) of convex portions 121 which form convex shapes protruding in the axial directions of the wall portion 113 in which those convex portions are disposed, are disposed in such a manner that the side plate portion 120 in shared commonly by the convex portions 121 which are adjacent to each other and are oriented in opposite directions alternately in the circumferential direction.

In the plurality of sealing portions 117 which are provided continuously in series in the longitudinal direction of the seal member 101, the adjacent sealing portions 117 have waveforms in different phases. Here, the adjacent sealing portions 117 have different phases in which the directions of the convex portions 121 of the sealing portions 117 which are situated at the same angular positions around the axes thereof become opposite to each other in the axial direction.

Figure 14:
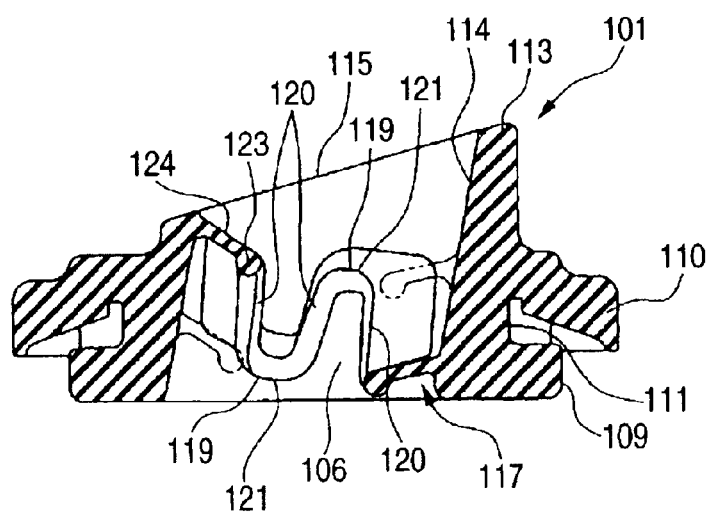
FIG. 14 is a side sectional view showing the seal member according to the embodiment of the invention.
Figure 15:
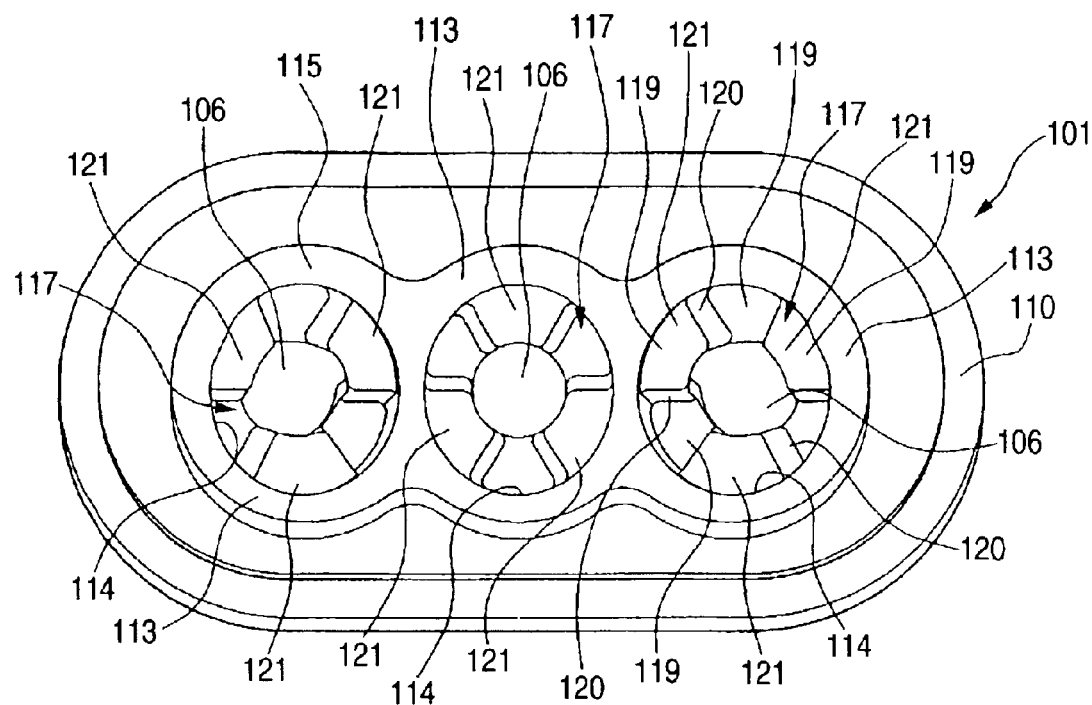
FIG. 15 is a plan view showing the seal member according to the embodiment of the invention.
Figure 16:
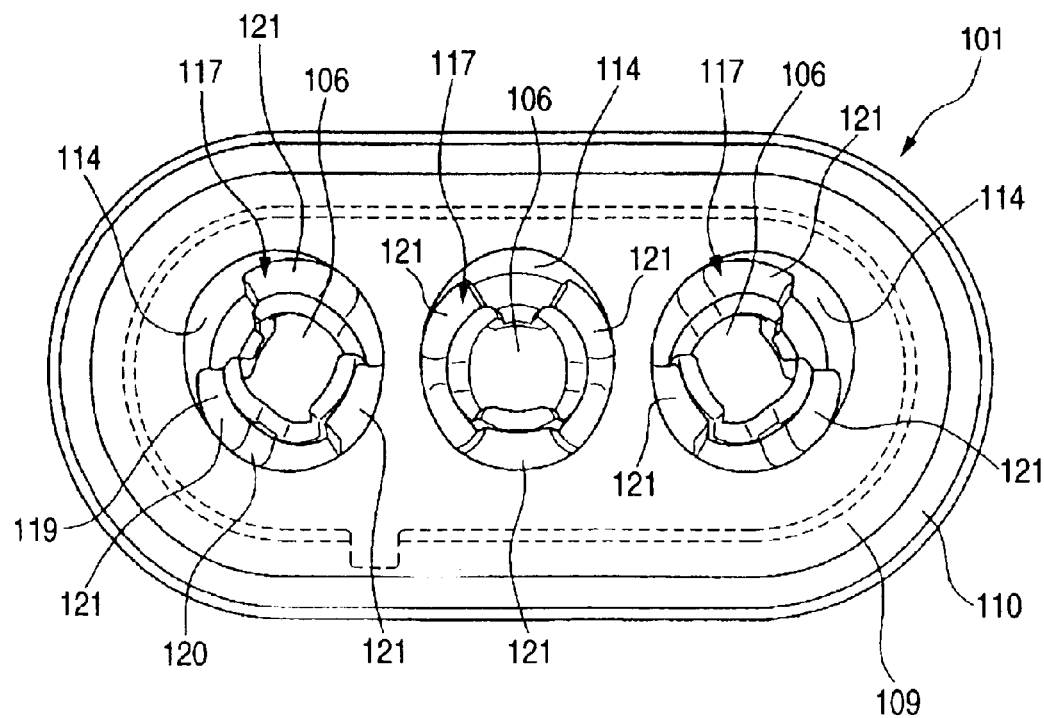
FIG. 16 is a bottom view showing the seal member according to the embodiment of the invention.

Here, as shown in FIG. 14, a thick portion 123 having a circular cross section is formed around the full circumference of an inner circumferential edge portion on the opening 106 side of the sealing portion 117, and a portion between the thick portion 123 and the inner circumferential surface 114 of the wall portion 113 or a peripheral portion of the thick portion 123 is formed into a thin portion 124 having a substantially constant thickness which is thinner than the thick portion 123. Namely, the sealing portion 117 is constructed such that the inner circumferential edge portion on the opening side is thicker than the peripheral portion of the inner circumferential edge portion.

Then, as shown in FIG. 12, with the annular groove portion 111 being fitted in the mounting hole 103 formed in the lower plate portion 102 of the exterior box 50 and the lower plate portion 102 being held between the holding flanges 109, 110 at the sides of the seal member 101, the seal member 101 is mounted to the lower plate portion 102 while closing the gap formed between the seal member 101 and the lower plate portion 102. As this occurs, the seal member 101 is mounted such that the holding flange 109 is situated inside the exterior box 50.

Figure 17:
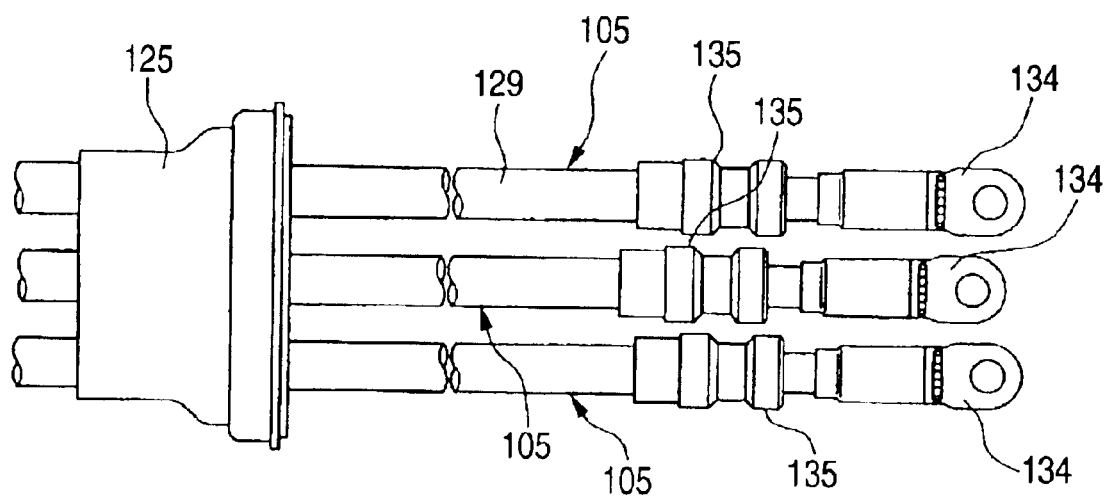
FIG. 17 is a front view showing cables which are allowed to pass through the seal member according to the embodiment of the invention.
Figure 18:
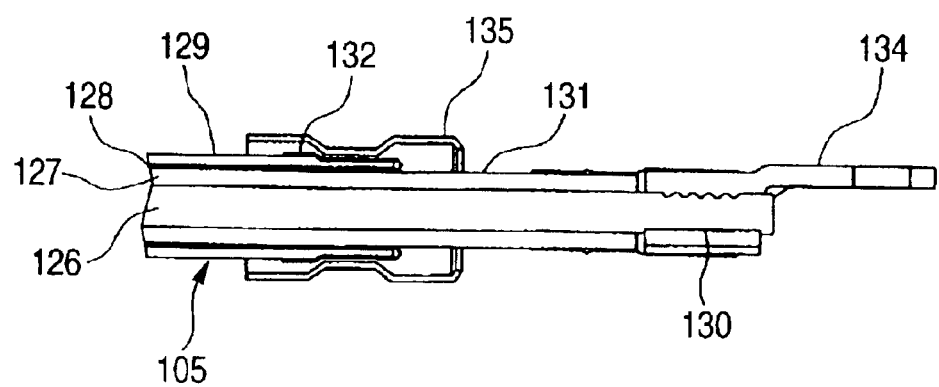
FIG. 18 is a sectional view showing the cable which is allowed to pass through the seal member according to the embodiment of the invention.

The three cables 105 for three-phase alternating current are, as shown in FIG. 17, held in a connected condition by a holding member 125, and as shown in FIG. 18, a conductor 126 having a circular cross section passes through the center of the cable 115 and is circumferentially covered with an inner insulation coating 127, and a net-like grounding conductor 128 is disposed in such a manner as to cover the inner insulation coating 127 circumferentially, the grounding conductor 128 being covered with an outer insulation coating 129 circumferentially. Then, a distal end portion of the cable 115 is made to be a conductor exposed portion 130 where the conductor 126 is exposed when the inner insulation coating 127, the grounding conductor 128 and the outer insulation coating 129 are removed, and a portion next to the conductor exposed portion 130 is made to be an inner insulation coating exposed portion 131 where the inner insulation coating 127 is exposed by removing the outer insulation coating 129 and folding up the grounding conductor 128. Furthermore, a portion next to this inner insulation coating exposed portion 131 is made to be a folded-up grounding conductor exposed portion where the grounding conductor 128 is exposed by folding it up over the surface of the outer insulation coating 129.

Then, a connection terminal 134 is clamped to be fixed to the conductor exposed portion 130 and the inner insulation coating exposed portion 131 while the connection terminal 134 is connected to the conductor exposed portion 130, and a cylindrical shield terminal 135 having a diameter larger than that of the cable 105 is fixed onto the folded-up grounding conductor exposed portion 132 by clamping radially inwardly an axial intermediate portion thereof.

The three cables 105 which are constructed as has been described above are passed, respectively, through the corresponding openings 106 in the seal member 101 from the outside of the exterior box 50, and as this occurs, each cable 105 is first inserted into the opening 106 in the seal member 101 at the connection terminal 134 mounted on the cable 115. Following this, the large-diameter shield terminal 135 mounted on the cable 105 is inserted into the opening 106 in the seal member 101. Then, as shown in FIG. 11, the connection terminal 134 is mounted to the inverter 7 installed in the exterior box 50, and the shield terminal 135 is mounted on a shield terminal mounting portion 137 within the exterior box 50, whereby in this condition the cable 105 fits in the thick portion 123 of the sealing portion 117 at the outer insulation coating 129. As a result, the seal member 101 allows the cable 105 to pass through the opening 106 while closing the gap between the seal member 101 and the cable 105 which has passed through the opening 106.

The gap between the sealing portion 117 and the cable 105 is closed in order to increase the adhesion by the sealing portion 117, and when the large diameter shield terminal 135 passes through the opening 106, the large diameter shield terminal 135 passes through the opening 106 by largely expanding the sealing portion 117 in a diametrical direction. However, as has been described above, since the sealing portion 117 is formed into the wavy and annular shape which undulates in the direction in which the cable 105 passes through the sealing portion 117, the sealing portion 117 can also easily deform in the diametrically expanding direction, whereby while facilitating the passage of the shield terminal 135, the cable 105 can be made to adhere to the sealing portion 117 at the outer insulation coating 129 after the passage of the shield terminal 135. Consequently, a sufficient level of sealing capability can be secured relative to the cable 105 which is inconsistent in its shape. In addition, with the seal member 101, the sufficient level of sealing capability can also be secured, of course, relative to a cable having a consistent shape.

In addition, since the sealing portion 117 is formed into the wavy and annular shape which undulates in the direction in which the cable 105 passes through the sealing portion, the sealing portion 117 can easily be deformed in respective directions while maintaining the sealing capability relative to the cable 105, and when vibrations are being applied, the vibrations can be absorbed through the deformation of the sealing member 117. Consequently, the deterioration in assembling property can be prevented, while securing a sufficient level of sealing capability relative to the cable 105, and as a result thereof, the working property can be increased.

In addition, since the sealing portion 117 is constructed such that the inner circumferential edge portion on the opening 106 side constitutes the thick portion 123 which is thicker than the thin portion 124 constituted by the peripheral portion of the inner circumferential edge portion, the sealing portion 117 can easily deform by virtue of the thin portion 124 when the cable passes through the sealing portion and when vibrations are applied thereto, while the cable 105 is pressed against by the thick portion 123 to thereby secure the required sealing capability.

Furthermore, since the plurality of sealing portions 117 are provided continuously in series such that the adjacent sealing portions 117 have waveforms in different phases, in case the cables 105 which pass through the openings 106 inside the sealing portions 117 attempt to fall all together in the same direction at one time due to errors at the time of assembly, the attempted fall can be prevented. Consequently, a deterioration in sealing capability attributed to such a fall can be prevented.

While the seal member 101 according to the embodiment has been described as having the three sealing portions 117 in which the openings 106 are formed in order to allow for the passage of the three cables 105 for three-phase alternating current, the construction of the seal member 101 can be modified so as to match the number of cables 105 which are allowed to pass through the seal member 101, and it goes without saying that in the event that there is one cable 105 which is allowed to pass through the seal member 101, the seal member 101 can be modified to have one sealing portion 101.

In addition, it goes without saying that the seal member 101 according to the invention can also be applied for passage of pass-through members other than cables such as harnesses.

Thus, as has been described heretofore, according to the first aspect of the invention, since the periphery of the opening is made to constitute the wavy and annular sealing portion that undulates in the direction in which the pass-through member passes through the seal member, the sealing portion is allowed to easily deform, and even if the gap between the sealing portion and the pass-through member is closed in order to increase the adhesion by the sealing portion, vibrations, when applied, can be absorbed by virtue of the deformation of the sealing portion. Consequently, the deterioration in assembling property can be prevented while securing the sufficient level of sealing capability relative to the pass-through members.

In addition, since the periphery of the opening is made to constitute the wavy and annular sealing portion that undulates in the direction in which the pass-through member passes through the seal member, the sealing portion is allowed to easily deform also in a direction in which the diameter thereof is expanded, and even in the event that sealing is implemented at a small diameter portion of the pass-through member which has a large diameter portion at a position along the small diameter portion after the large diameter portion has been allowed to pass through the sealing portion, the sealing portion is allowed to adhere to the small diameter portion after the large diameter portion is allowed to easily pass through the sealing portion. Consequently, the sufficient level of sealing capability can be secured relative not only to pass-through members having shapes which are consistent throughout the members but also to those having shapes which vary along the length of the members.

According to the second aspect of the invention, since the inner circumferential edge portion on the opening side is made to be thicker than the peripheral portion of the inner circumferential edge portion, the deformation of the pass-through member which results not only when the pass-through member passes through the sealing portion but also when vibrations are applied thereto can be facilitated, while the pass-through member is pressed against by this thick inner circumferential edge portion so as to secure the sealing capability.

According to the third aspect of the invention, since the plurality of the sealing portions are provided continuously in series such that the adjacent sealing portions have waveforms in different phases, in case pass-through members which pass through the openings inside the sealing portions attempt to fall all together in the same direction at one time, the attempted fall can be prevented. Consequently, the deterioration in sealing capability attributed to such a fall can be prevented.

What is claimed is:

1. A seal member made of a resilient material which allows a pass-through member to pass through an opening while sealing a gap between the opening and said pass-through member that has passed through said opening, said seal member comprising:

a wall portion with an inner circumferential surface; and a wavy and annular sealing portion that is formed on said inner circumferential surface and undulates in a circumferential direction completely around said inner circumferential surface and undulates in a direction in which said pass-through member passes through said seal member.

2. The seal member as set forth in claim 1, wherein said sealing portion is constructed such that an inner circumferential edge portion of said sealing portion which faces said opening is made to be thicker than a peripheral portion of said inner circumferential edge portion.

3. The seal member as set forth in claim 2, wherein a plurality of said sealing portions are provided in series much that adjacent ones of said sealing portions have waveforms in different phases.

4. The seal member as set forth in claim 2, wherein the sealing portion comprises:

a top plate portion which is formed substantially into an isosceles trapezoid in which the width on the opening side is narrower;

two side plate portions which extend in an inclined fashion from sides of the top plate portion in a circumferential direction of the opening such that a distance between the side plate portions expands gradually; and a plurality of convex portions which from convex shapes protruding in the axis directions and are disposed adjacent to the two side plate portions.

5. The seal member as set forth in claim 1, wherein a plurality of said sealing portions are provided in series such that adjacent ones of said sealing portions have waveforms in different phases.

6. The seal member as set forth in claim 1, wherein the sealing portion comprises:

a top plate portion which is formed substantially into an isosceles trapezoid in which the width on the opening side is narrower;

two side plate portions which extend in an inclined fashion from sides of the top plate portion in a circumferential direction of the opening such that a distance between the side plate portions expands gradually; and a plurality of convex portions which form convex shapes protruding in the axial directions and are disposed adjacent to the two side plate portions.

* * * * *